United States Patent
Scheibert

(10) Patent No.: US 8,685,581 B2
(45) Date of Patent: Apr. 1, 2014

(54) EVAPORATIVELY COOLED FUEL CELL SYSTEM AND METHOD FOR OPERATING AN EVAPORATIVELY COOLED FUEL CELL SYSTEM

(71) Applicant: Airbus Operations GmbH, Hamburg (DE)

(72) Inventor: Tobias Scheibert, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 13/893,913

(22) Filed: May 14, 2013

(65) Prior Publication Data

US 2013/0260273 A1 Oct. 3, 2013

Related U.S. Application Data

(63) Continuation of application No. 12/739,514, filed as application No. PCT/EP2008/009735 on Nov. 18, 2008, now abandoned.

(60) Provisional application No. 61/013,670, filed on Dec. 14, 2007.

(51) Int. Cl.
*H01M 8/04* (2006.01)

(52) U.S. Cl.
USPC .......................................... 429/434; 429/433

(58) Field of Classification Search
USPC .......................................... 429/413, 433, 434
See application file for complete search history.

(56) References Cited

U.S. PATENT DOCUMENTS

| 7,550,218 | B2* | 6/2009 | Hoffjann et al. | 429/440 |
| 2004/0219400 | A1* | 11/2004 | Al-Hallaj et al. | 429/13 |
| 2005/0048354 | A1* | 3/2005 | Breault | 429/41 |
| 2005/0196656 | A1* | 9/2005 | Gomez | 429/30 |
| 2007/0072027 | A1* | 3/2007 | Sridhar et al. | 429/26 |

FOREIGN PATENT DOCUMENTS

| JP | 2001-349681 A | | 12/2001 |
| JP | 2002343396 A | * | 11/2002 |
| JP | 20003-500802 A | | 1/2003 |
| JP | 2004-259615 A | | 9/2004 |
| JP | 2005044749 A | * | 2/2005 |
| JP | 2005183281 A | * | 7/2005 |
| WO | WO 2007086827 A2 | * | 8/2007 |

OTHER PUBLICATIONS

Japanese Official Action mailed May 14, 2013 in counterpart Japanese Application No. 2010-537270 (English translation of Notification of Reason for Refusal). (8 pgs.).

* cited by examiner

*Primary Examiner* — Gregg Cantelmo
(74) *Attorney, Agent, or Firm* — Carter, DeLuca, Farrell & Schmidt, LLP

(57) ABSTRACT

A fuel cell system (10) comprises a fuel cell (14) and an evaporative cooling system (16), which is in thermal contact with the fuel cell (14), in order that heat generated by the fuel cell (14) during operation of the fuel cell (14) is absorbed through evaporation of a cooling medium and is removed from the fuel cell (14). The fuel cell system (10) further comprises a device (22) for sensing the pressure in the evaporative cooling system (16). A control unit (24) is adapted to control the operating temperature of the fuel cell (14) in dependence on signals that are supplied to the control unit (24) from the device (22) for sensing the pressure in the evaporative cooling system (16), in such a way that the cooling medium of the evaporative cooling system (16) is transferred from the liquid to the gaseous state of matter by the heat generated by the fuel cell (14) during operation of the fuel cell (14).

11 Claims, 3 Drawing Sheets

Figure 1:
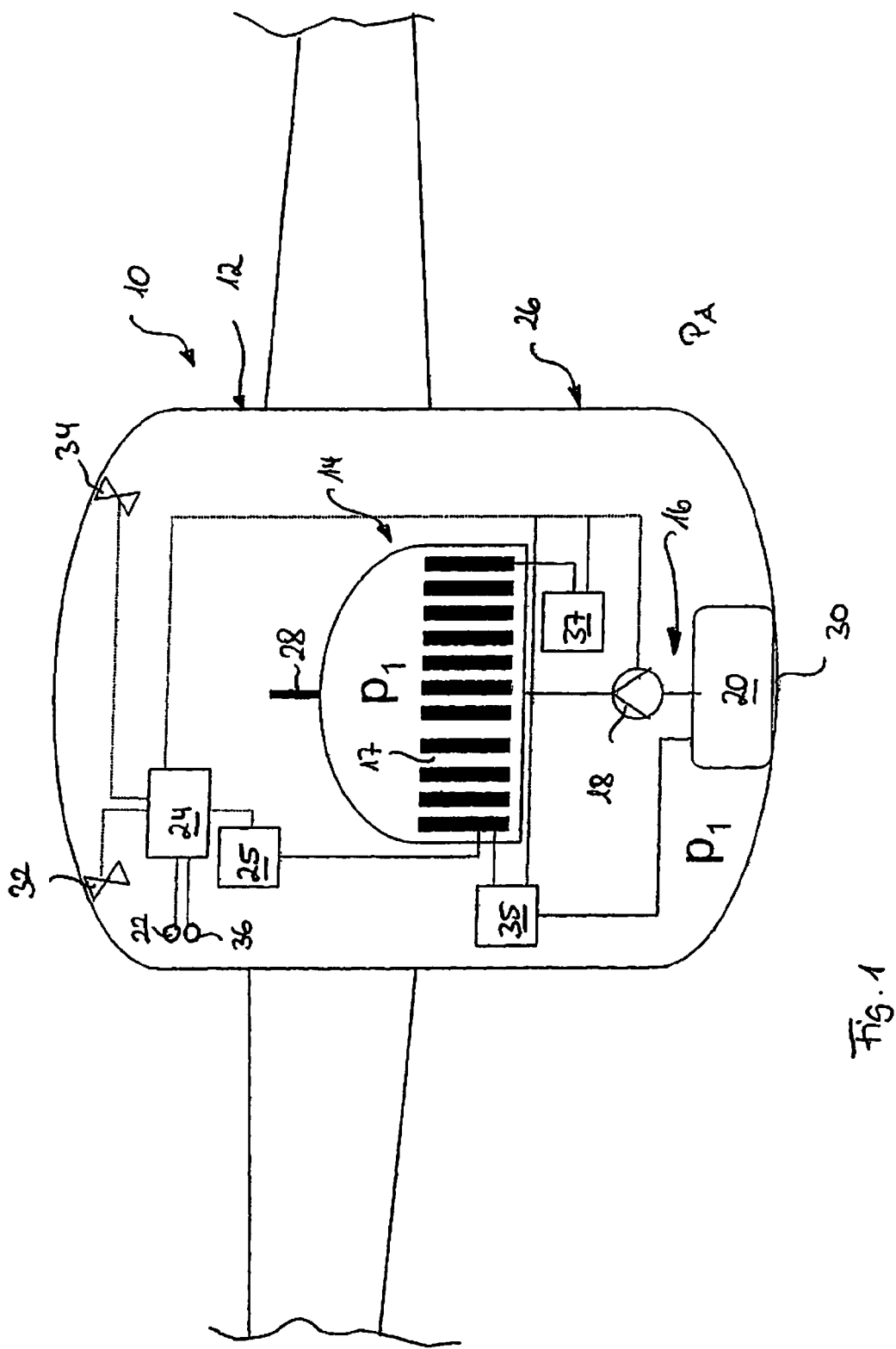

EVAPORATIVELY COOLED FUEL CELL SYSTEM AND METHOD FOR OPERATING AN EVAPORATIVELY COOLED FUEL CELL SYSTEM

CROSS-REFERENCE TO RELATED APPLICATIONS

The present application is a continuation of and claims the benefit to U.S. patent application Ser. No. 12/739,514, filed Apr. 23, 2010, now abandoned, which is a national stage entry of PCT/EP2008/009735, filed Nov. 18, 2008, which claims priority to German Patent Application No. 102007060428.0, filed Dec. 14, 2007, and Provisional Application No. 61/013,670, filed Dec. 14, 2007, the contents of which are herein incorporated by reference in their entirety.

The present invention relates to an evaporatively cooled fuel cell system and to a method for operating an evaporatively cooled fuel cell system.

Fuel cell systems enable electrical power to be generated with low emissions and high efficiency. For this reason, efforts are being made at present to apply fuel cell systems in various mobile applications, such as, for example, in automobile engineering, in shipping or in aviation, for the purpose of generating electrical energy. For example, in an aircraft, it is conceivable for the generators currently used for the on-board electrical power supply, which are driven by the main engines or the auxiliary turbine, to be replaced by a fuel cell system. Moreover, a fuel cell system could also be used for the emergency electrical power supply of the aircraft, and replace the ram air turbine (RAT) used hitherto.

Fuel cells usually comprise a cathode region, and an anode region, which is separated from the cathode region by an electrolyte. When the fuel cell is in operation, a fuel, for example hydrogen, is supplied to the anode side of the fuel cell, and an oxygen-containing oxidant, for example air, is supplied to the cathode side of the fuel cell. In a polymer electrolyte membrane (PEM) fuel cell, the hydrogen molecules react, at an anode catalyst present in the anode region, for example according to equation (1)

$$H_2 \rightarrow 2.H^+ + 2.e^- \quad (1)$$

and, by forming positively charged hydrogen ions, thereby deliver electrons to the electrode.

The $H^+$ ions formed in the anode region then diffuse through the electrolyte to the cathode, where, at a cathode catalyst present in the cathode region, they react with the oxygen supplied to the cathode and with the electrons routed to the cathode via an external electrical circuit, according to equation (2)

$$0.5*O_2 + 2.H^+ + 2.e^- \rightarrow H_2O \quad (2)$$

to form water.

In addition to generating electrical energy, a fuel cell, when in operation, generates thermal energy, which must be removed from the fuel cell with the aid of a cooling system, in order to prevent overheating of the fuel cell. In the case of mobile applications, in which usually only a portion of the thermal energy generated by the fuel cell during operation can be supplied to in-system or external heat sinks for further use, frequently at least a portion of the heat of reaction generated by the fuel cells must be emitted to the environment. A fuel cell used in an aircraft, for example for the on-board electrical power supply, must be so designed that it is capable of fulfilling a large requirement for electrical energy. However, a fuel cell that has a high capacity in respect of generating electrical energy also generates a large quantity of thermal energy, and therefore has a high cooling requirement.

In principle, a fuel cell used on board an aircraft can be cooled in various ways. For example, liquid cooling is possible, wherein a liquid is used as a cooling medium, in order to absorb the heat of reaction generated by the fuel cell. The cooling capacity of a liquid cooling system is calculated roughly according to equation (3)

wherein $\dot{Q}_F$ is the heat absorption capacity of the cooling liquid, $\dot{m}_F$ is the mass flow rate, $c_{pF}$ is the thermal capacity of the cooling liquid, and $\Delta T_F$ is the temperature difference between the cooling-liquid outlet temperature and the cooling-liquid inlet temperature.

As is directly evident from equation (3), effective liquid cooling, in which the cooling liquid is routed in a circuit, requires that cooling liquid heated through absorption of heat from the fuel cell be cooled down again by $\Delta T_F$, before it can again effectively absorb waste heat from the fuel cell. For the purpose of cooling down the cooling liquid by $\Delta T_F$, the cooling liquid can be supplied, for example, to a heat exchanger, in which the thermal energy stored in the cooling liquid is transferred to a further cooling medium, for example ambient air. As an alternative to liquid cooling of the fuel cell with subsequent ambient-air recooling of the cooling liquid, direct ambient-air cooling of the fuel cell is also conceivable.

Irrespective of whether an ambient-air cooling system is used for direct ambient-air cooling of a fuel cell or serves only to recool the cooling liquid of a liquid cooling system, the cooling capacity of the ambient-air cooling system is calculated roughly according to equation (4)

wherein $\dot{Q}_L$ is the heat absorption capacity of the cooling air, $\dot{m}_L$ is the mass flow rate of the cooling air, $c_{pL}$ is the thermal capacity of the cooling air, and $\Delta T_L$ is the temperature difference between the cooling-air outlet temperature and the ambient-air temperature.

Equation (4) makes clear that, the smaller the temperature difference $\Delta T_L$ between the cooling-air outlet temperature and the ambient-air temperature, the lesser is the cooling capacity of ambient-air cooling. In the case of the cooling of a low-temperature PEM fuel cell, whose operating temperature is usually between approximately 60 and 110° C., with an output optimum between approximately 60 and 90° C., there therefore exists the problem that the temperature difference $\Delta T_L$ between the cooling-air outlet temperature, corresponding maximally to the operating temperature of the fuel cell, and the ambient-air temperature is relatively small, and the cooling capacity of the cooling system is therefore correspondingly small. Consequently, large heat transfer surfaces are required for adequately removing heat from a PEM fuel cell to the environment. Liquid and/or air cooling systems for PEM fuel cells are therefore necessarily of large volume and of relatively great weight, which is very disadvantageous for use in mobile applications, and particularly in aviation. Moreover, cold air required for cooling a PEM fuel cell used on board an aircraft has to be sucked in from the aircraft environment and, following the absorption of the heat of reaction generated by the fuel cell, removed back into the aircraft environment. However, both the suction intake of the air and its removal into the aircraft environment causes increased air resistance, which is disadvantageous for efficient flight operation of the aircraft.

In contrast to the cooling systems described above, the cooling capacity of which depends substantially on the difference between the temperature of the cooling medium and the ambient-air temperature, the cooling capacity of an evaporative cooling system according to equation (5)

$$\dot{Q}_V = \dot{m}_V \cdot c_{pL} \cdot \Delta h_V \quad (5)$$

is determined by the evaporation enthalpy $\Delta h_V$ of a cooling medium used in the evaporative cooling system, $\dot{Q}_V$ being the heat absorption capacity of the cooling medium to be transferred from the liquid to the gaseous state of matter, and $\dot{m}_V$ being the mass flow rate of the cooling medium to be transferred from the liquid to the gaseous state of matter.

Following evaporation, a cooling medium routed in a circuit in an evaporative cooling system does have to be transferred back to its liquid state of matter through condensation. It is not necessary, however, for the cooling medium to be cooled to a temperature that is below the operating temperature of a fuel cell cooled by the evaporative cooling system. Moreover, compared with the liquid-cooling and air-cooling systems described above, an evaporative cooling system has the advantage that the change of state of conventional cooling media such as, for example, water, requires very much more energy than the cooling medium is capable to absorb in the liquid state. An evaporative cooling system can therefore be operated with a significantly lesser cooling-medium mass flow rate than an air cooling system having a comparable cooling capacity.

An evaporative cooling system for cooling a fuel cell is known, for example, from DE 199 35 719 A1. In the cooling system described in DE 199 35 719 A1, a cooling medium, for example water, is routed through cooling pipes, which are arranged in an anode gas-supply chamber and an anode exhaust-gas chamber of a fuel-cell stack. The cooling medium evaporates as it flows through the cooling pipes, and thereby absorbs up to 90% of the quantity of heat emitted from the fuel cell through thermal radiation.

The present invention is directed to the object of providing an evaporatively cooled fuel cell system that is suitable, in particular, for use in an aircraft. Further, the invention is directed to the object of providing a method for operating such an evaporatively cooled fuel cell system.

This object is achieved by a fuel cell system having the features specified in claim 1, and by a method, having the features specified in claim 11, for operating a fuel cell system.

A fuel cell system according to the invention comprises a fuel cell, preferably a fuel cell of the MW output class, the term "fuel cell" here denoting not only a single cell, but also a fuel-cell stack comprising a multiplicity of fuel cells. The fuel cell is preferably a PEM fuel cell, the anode region of which is connected to a hydrogen source, and the cathode side of which is supplied with an oxygen-containing oxidation means, preferably air. The fuel to be supplied to the anode region of the fuel cell, preferably hydrogen, can be stored in a fuel tank integrated into the fuel cell system according to the invention. Alternatively or in addition thereto, the fuel cell system according to the invention can comprise a fuel generating installation for generating the fuel to be supplied to the anode region of the fuel cell. The cathode side of the fuel cell can be connected to a pressure side of a compressor. The compressor can be a compressor having a combined air and vapour inlet.

The fuel cell can be a low-temperature PEM fuel cell or a high-temperature PEM fuel cell, a PEM fuel cell containing a composite electrolyte having inorganic material, a polybenzimidazole PEM fuel cell or a polyperfluorsulfonic acid PEM fuel cell. When in operation, the fuel cell, in addition to producing electrical energy, produces thermal energy, which must be removed from the fuel cell in order to prevent the fuel cell from overheating.

The fuel cell system according to the invention therefore further comprises an evaporative cooling system, which is in thermal contact with the fuel cell, in order that heat generated by the fuel cell during operation of the fuel cell is absorbed through evaporation of a cooling medium and is removed from the fuel cell. As explained above, an evaporative cooling system is distinguished by a high heat absorption capacity, and consequently an excellent cooling capacity, owing to the high evaporation enthalpy required for bringing the cooling medium from the liquid to the gaseous state of matter. The evaporative cooling system of the fuel cell system according to the invention can therefore be operated with a significantly lesser cooling-medium mass flow rate, compared with an air or liquid cooling system having a similar heat absorption capacity, and, moreover, is of a compact design and lower weight. Further, the evaporative cooling system has low energy losses, does not cause any additional air resistance when the fuel cell system according to the invention is used on board an aircraft and also during operational load peaks is capable of reliably and autonomously supplying the fuel cell with cooling capacity. Finally, a high system dynamic can be realized in the evaporative cooling system of the fuel cell system according to the invention, since the expansion of the cooling medium upon evaporation enables the cooling medium to be rapidly removed from the region of the evaporative cooling system that is in thermal contact with the fuel cell.

The evaporative cooling system of the fuel cell system according to the invention can be realized as a system designed separate from the fuel cell. Preferably, however, the evaporative cooling system is at least partially integrated into components of the fuel cell, and comprises, for example, cooling channels formed in bipolar plates, separator plates, cover plates and/or lateral delimiting plates of the fuel cell or fuel-cell stack. Alternatively or in addition thereto, cooling channels of the evaporative so cooling system can also extend in an anode gas supply chamber, a cathode gas supply chamber, an anode exhaust-gas chamber and/or a cathode exhaust-gas chamber of the fuel cell. A cooling medium flows through the cooling channels of the evaporative cooling system, which cooling medium is transferred from the liquid to the gaseous state of matter through absorption of the heat generated by the fuel cell during operation. Water, for example, can be used as a cooling medium, which is evaporated by nucleate boiling as it flows through the cooling channels of the evaporative cooling system.

The fuel cell system according to the invention further comprises a device for sensing the pressure in the evaporative cooling system, i.e. in the parts of the evaporative cooling system in which the cooling medium is transferred from the liquid to the gaseous state of matter. If the evaporative cooling system, i.e. the parts of the evaporative cooling system in which the cooling medium is transferred from the liquid to the gaseous state of matter, is/are connected to the environment of the evaporative cooling system, the pressure sensing device can be adapted and so arranged that it senses the ambient pressure in the environment of the evaporative cooling system and or the fuel cell. A pressure sensor, for example, can be used as the pressure sensing device. The pressure sensing device supplies signals, which are characteristic of the pressure in the evaporative cooling system, to a control unit, which is realized, for example, as an electronic control unit.

The control unit of the fuel cell system according to the invention is adapted to control the operating temperature of the fuel cell in dependence on the signals that are supplied to the control unit from the device for sensing the pressure in the evaporative cooling system, in such a way that the cooling medium of the evaporative cooling system is transferred from the liquid to the gaseous state of matter by the heat generated by the fuel cell during operation of the fuel cell. In other words, the control unit is adapted so to control the operating temperature of the fuel cell in dependence on the pressure in the evaporative cooling system, i.e. in the parts of the evaporative cooling system in which the cooling medium is evaporated, such that it is always ensured that the heat generated by the fuel cell during operation of the fuel cell is sufficient to transfer the cooling medium of the evaporative cooling system from the liquid to the gaseous state of matter. As a result, proper functioning of the evaporative cooling system is always ensured. In the fuel cell system according to the invention, the temperature of the cooling medium after absorption of the heat generated by the fuel cell is just under the operating temperature of the fuel cell, such that a high heat transfer, and thus a particularly good cooling capacity of the evaporative cooling system, is realized. Moreover, the substantially isothermal change of state of matter of the cooling medium renders possible stable operation of the evaporative cooling system.

The evaporation temperature of usual cooling media such as, for example, water, decreases as pressure decreases. For example, the evaporation temperature of water is 100° C. at a pressure corresponding to the atmospheric pressure at sea-level (1.0132 bar). By contrast, at a pressure of 0.1992 bar, as exists at an altitude of 12192 m (40000 feet), i.e. the cruising altitude of a commercial aircraft, the evaporation temperature of the water is only 60° C. Consequently, if the evaporative cooling system of a fuel cell system according to the invention is operated with water as the cooling medium, in the case of a pressure in the evaporative cooling system corresponding to the atmospheric pressure at sea-level, the operating temperature of the fuel cell must be selected to be so high that the heat generated by the fuel cell during operation is sufficient to heat the cooling medium of the evaporative cooling system to over 100° C. and thereby to provide for proper functioning of the evaporative cooling system. If, on the other hand, the pressure in the evaporative cooling system is only 0.1992 bar, the fuel cell can be operated with a lesser operating temperature, since the heat generated by the fuel cell during operation only has to be sufficient to heat the cooling medium to 60° C.

A low-temperature PEM fuel cell attains its output optimum when it is operated at an operating temperature of between approximately 60 and 90° C. If, in the fuel cell system according to the invention, it is determined, with the aid of the pressure sensing device, that there is a sufficiently low pressure in the evaporative cooling system, for example due to an ambient pressure which is lower than the atmospheric pressure at sea-level, the control unit can lower the operating temperature of the fuel cell to such an extent that an optimum output of the fuel cell is achieved, but the heat generated by the fuel cell during operation is still sufficient to transfer the cooling medium of the evaporative cooling system from the liquid to the gaseous state of matter and thereby to ensure proper functioning of the evaporative cooling system.

When in flight, an aircraft is predominantly in an environment in which the ambient pressure is below the atmospheric pressure at sea-level. This fact can be used, in a particularly advantageous manner, in a fuel cell system according to the invention used on board an aircraft, to keep the operating temperature of the fuel cell below 100° C., but insofar as possible in the optimum operating temperature range of between approximately 60 and 90° C., for the majority of the operating period of the fuel cell. This requires only that the evaporative cooling system, i.e. the parts of the evaporative cooling system in which the cooling medium is evaporated, be arranged in the non-pressurized region of the aircraft and be connected to the ambient atmosphere, such that the lower ambient pressure in the environment of the aircraft is present in these parts of the evaporative cooling system.

For example, the control unit can keep the operating temperature of the fuel cell of a fuel cell system according to the invention used on board an aircraft at a constant temperature, insofar as possible in the optimum operating temperature range of the fuel cell, for as long as the aircraft is at a constant cruising altitude. On the other hand, when the aircraft is in ascent, the control unit can lower the operating temperature of the fuel cell in dependence on the decreasing ambient pressure, whereas, when the aircraft is in descent, it can increase the operating temperature of the fuel cell in dependence on the increasing ambient pressure.

If water is used as a cooling medium in the evaporative cooling system of the fuel cell system according to the invention, the control unit can keep the operating temperature of the fuel cell at, for example, approximately 60° C., when the aircraft is at a constant cruising altitude of approximately 12192 m (40000 feet). When the aircraft is in ascent, from a starting location at approximately sea-level, until the cruising altitude is attained, the control unit can reduce the operating temperature of the fuel cell continuously during the ascent, from approximately 100° C. to approximately 60° C., for example in dependence on the decreasing ambient pressure. On the other hand, when the aircraft is in descent, from the cruising altitude to a landing location at approximately sea-level, the control unit can increase the operating temperature of the fuel cell continuously from approximately 60° C. to approximately 100° C., in dependence on the increasing ambient pressure.

In a preferred embodiment of the fuel cell system according to the invention, the control unit is adapted to control the operating temperature of the fuel cell in dependence on the signals that are supplied to the control unit from the device for sensing the pressure in the evaporative cooling system, in such a way that the evaporation of the cooling medium of the evaporative cooling system by the heat generated by the fuel cell during operation of the fuel cell is effected in the wet-steam region of the cooling medium. "Wet steam" here is understood to be a system in which boiling liquid and saturated steam are in equilibrium.

If the evaporation of the cooling medium used in the evaporative cooling system of the fuel cell system according to the invention is effected in the wet-steam region of the cooling medium, during the evaporation of the cooling medium, boiling cooling medium, in the liquid state of matter, is in equilibrium with saturated steam of the cooling medium. This is the case whenever the cooling medium, during evaporation, is heated to its pressure-dependent evaporation temperature. The control device thus preferably controls the operating temperature of the fuel cell such that the cooling medium of the evaporative cooling system is heated to a temperature corresponding to the pressure-dependent evaporation temperature of the cooling medium. For example, the fuel cell can be operated at an operating temperature that is 0 to 50° C., preferably 1 to 3° C., above the pressure-dependent evaporation temperature of the cooling medium of the evaporative cooling system.

The fuel cell system according to the invention preferably further comprises a fuel-cell operating-pressure generating system, which is adapted to generate a desired pressure in the fuel cell, i.e. in the components of the fuel cell in which there are no integrated cooling channels of the evaporative cooling system. The fuel-cell operating-pressure generating system of the fuel cell system according to the invention can be integrated, for example, into a media supply system of the fuel cell system, and comprise a compressor for supplying an oxidant into the cathode region of the fuel cell and/or comprise a corresponding delivery device for supplying fuel into the anode region of the fuel cell. The fuel-cell operating-pressure generating system serves to bring the fuel-cell operating pressure to a desired level, or to keep it at a desired level, irrespective of the ambient pressure in the environment of the fuel cell and irrespective of the pressure in the evaporative cooling system.

The fuel-cell operating-pressure generating system can be adapted to generate in the fuel cell a pressure that is lower or higher than the ambient pressure in the environment of the fuel cell and/or than the pressure in the evaporative cooling system. Further, the fuel cell system according to the invention can comprise a control unit realized, for example, as an electronic control unit, for controlling the fuel-cell operating-pressure generating system. The control unit for controlling the fuel-cell operating-pressure generating system can be a separate control unit. As an alternative thereto, however, the control unit for controlling the fuel-cell operating-pressure generating system can also be integrated into the control unit for controlling the operating temperature of the fuel cell.

As explained above, in the fuel cell system according to the invention the operating temperature of the fuel cell is always controlled, in dependence on the pressure in the evaporative cooling system, such that the cooling medium of the evaporative cooling system is brought from the liquid to the gaseous state by the heat generated by the fuel cell during operation of the fuel cell. In the case of correspondingly high operating temperatures, however, the problem can arise that substances and/or substance mixtures such as, for example, water, that are usually present in liquid form in the fuel cell, i.e., for example, in the anode region, the cathode region, in the region of a membrane separating the anode region from the cathode region, in the anode gas lines or the cathode gas lines, evaporate.

In order to prevent an unwanted evaporation of substances and/or substance mixtures usually present in liquid form in the fuel cell from during operation of the fuel cell, the control unit for controlling the fuel-cell operating-pressure generating system can be adapted to control the fuel-cell operating-pressure generating system such that there is generated in the fuel cell a pressure at which unwanted evaporation of substances and/or substance mixtures usually present in liquid form in the fuel cell is prevented.

The control unit for controlling the fuel-cell operating-pressure generating system can be adapted to control the fuel-cell operating pressure in dependence on the operating temperature of the fuel cell. The operating temperature of the fuel cell that is used by the control unit as a control variable for controlling the fuel-cell operating-pressure generating system can be a set operating temperature of the fuel cell provided by the control unit for controlling the operating temperature of the fuel cell, or it can be an operating temperature of the fuel cell that is measured, for example, by means of a temperature sensor. Alternatively or in addition thereto, however, the control unit for controlling the fuel-cell operating-pressure generating system can also be adapted to control the fuel-cell operating pressure in dependence on signals supplied to it from the device for sensing the pressure in the evaporative cooling system. For example, the control unit for controlling the fuel-cell operating-pressure generating system can calculate a set operating temperature of the fuel cell on the basis of the signals of the pressure sensing device that are characteristic of the pressure in the evaporative cooling system, and use it as a control variable for the determination of an appropriate set operating pressure in the fuel cell.

If water is used as an environmentally benign cooling medium in the evaporative cooling system of the fuel cell system according to the invention, the fuel cell, realized, for example, as a PEM fuel cell, is preferably operated, in the case of a pressure in the evaporative cooling system corresponding approximately to the atmospheric pressure at sea-level, at an operating temperature of approximately 100 to 105° C. The control unit for controlling the fuel-cell operating-pressure generating system then preferably so controls the fuel-cell operating-pressure generating system that a pressure above the atmospheric pressure at sea-level, for example of 2 bar, is generated in the fuel cell. At a pressure of 2 bar, the evaporation temperature of water is 120.23° C., such that evaporation of water present in the fuel cell, i.e., for example, in the anode region, in the cathode region, in the region of a membrane separating the anode region from the cathode region, in the anode gas lines or the cathode gas lines, is reliably prevented at the operating temperature of the fuel cell.

As explained above, large quantities of heat can be removed from the fuel cell through the evaporation process taking place in the evaporative cooling system of the fuel cell system according to the invention. The heat removed from the fuel cell by the evaporative cooling system must then either be emitted to the environment or supplied to a further use. A heat transfer process can be described by equation (6)

$$\dot{Q}=k \cdot A \cdot \Delta t_{mlog} \quad (6)$$

wherein $\dot{Q}$ is the transferred heat, k is the heat transfer coefficient, A is the heat transfer surface and $\Delta t_{mlog}$ is the temperature gradient. The heat transfer coefficient k is calculated according to equation (7)

$$1/k=1/\alpha_{out}+s/\lambda+1/\alpha_{in} \quad (7)$$

wherein s is the wall thickness, $\lambda$ is the thermal conductivity coefficient and $\alpha$ is the heat transfer coefficient.

The heat transfer coefficient $\alpha$ is regarded as the main variable influencing the heat output $\dot{Q}$ to be transferred in the course of a heat transfer process. A large heat transfer coefficient $\alpha$ is achieved in the case of a condensation process. The evaporative cooling system of the fuel cell system according to the invention therefore preferably comprises a condenser, for condensing the cooling medium evaporated during operation of the fuel cell for the purpose of cooling the fuel cell. In the case of such a design of the evaporative cooling system, absorption of the heat of reaction of the fuel cell is effected through evaporation, whereas the emission of the heat of reaction of the fuel cell is realized through a condensation process. Since a condensation process, in a manner similar to an evaporation process, consumes very much more energy than, for example, a cooling medium in liquid form is able to absorb, an evaporative cooling system provided with a condenser operates particularly efficiently.

A further advantage of an evaporative cooling system provided with a condenser consists in that it can be operated as a circuit system, in which cooling medium that is condensed in the condenser is returned, in a liquid state of matter, back to the fuel cell, where it can be evaporated again for the purpose of cooling the fuel cell. Preferably, however, in an evaporative cooling system provided with a condenser, the fuel-cell cooling function is decoupled from the cooling-medium recovery function, such that adequate cooling of the fuel cell is ensured even in the event of failure of the condenser. In order to ensure that the evaporative cooling system is adequately supplied with cooling medium, the fuel cell system according to the invention can comprise an apparatus for supplying water produced during operation of the fuel cell into the evaporative cooling system.

The heat removed from the fuel cell by means of the evaporative cooling system can be emitted to the environment. This is particularly appropriate when the resultant heat is at a comparatively low temperature level of, for example, 60° C.

A condenser that enables waste heat generated by the fuel cell of the fuel cell system according to the invention to be efficiently removed to the environment can be realized, for example, in the form of an outer-skin cooler. The outer-skin cooler can be constituted, for example, by a wall, of which the inside, facing towards the fuel cell system, receives applied vaporous cooling medium and operates as a vapour condenser. On the other hand, an outside of the wall constituting the outer-skin cooler, which outside faces towards the environment, operates as an ambient-air heating means. A condenser realized as an outer-skin cooler is appropriate for use, in particular, in a fuel cell system according to the invention used on board an aircraft. The outer-skin cooler can then be constituted, for example, by a portion of the aircraft is outer skin, which receives, on its inside, applied cooling medium that is evaporated during operation of the fuel cell for the purpose of cooling the fuel cell.

If a portion of the aircraft's outer skin is used as an outer-skin cooler, large heat transfer surfaces can be created easily, and without additional components. This results in a considerable advantage in respect of weight. Moreover, an outer-skin cooler, constituted, for example, by a portion of the aircraft's outer skin, is distinguished by a high cooling capacity, and enables further advantages to be achieved in respect of weight, owing to the absence of pipelines. Moreover, the removal of heat by means of an outer-skin cooler produces little noise, and it does not require any large air-mass movements, which, in the case of the fuel cell system according to the invention being used in an aircraft, could result in unwanted, additional air resistance. Finally, disturbance of the loft is avoided.

As an alternative or in addition to the heat of reaction, produced by the fuel cell of the fuel cell system according to the invention during operation, being removed to the environment, the heat of reaction generated by the fuel cell can also be recovered and utilized. For this purpose, the fuel cell system according to the invention can comprise at least one device for utilizing heat stored in the cooling medium. The utilization of the heat stored in the cooling medium can be effected directly or indirectly. For example, the cooling medium, in the gaseous state of matter, can be supplied directly to the device for utilizing the heat stored in the cooling medium. However, cooling medium drawn from the evaporative cooling system in this process must be conveyed back into the evaporative cooling system in order to ensure proper cooling of the fuel cell.

Alternatively or additionally, it is also conceivable for only the heat stored in the cooling medium to be transferred to the device for utilization of this heat. For this purpose, the cooling medium, in the gaseous state of matter, can be routed, for example, through a heat exchanger, which is in thermal contact with the device for utilizing the heat stored in the cooling medium. Further, a condenser provided in the evaporative cooling system can be so realized and/or arranged that the heat released upon the condensation of the cooling medium in the condenser is transferred to the device for utilizing the heat stored in the cooling medium.

The device for utilizing the heat stored in the cooling medium can be a heating device, preferably realized as steam heating means, which utilizes for heating purposes the heat stored in the cooling medium. As an alternative thereto, however, the device for utilizing the heat stored in the cooling medium can also be a water desalination installation, for obtaining drinking water from sea water. In a fuel cell system according to the invention provided for use in an aircraft, the device for utilizing the heat stored in the cooling medium is preferably a de-Icing installation of the aircraft.

Finally, it is conceivable for the water used as a cooling medium in the evaporative cooling system to be utilized in an installation for supplying water and/or water vapour into an exhaust-gas stream of an aircraft. It is thereby possible to reduce the pollutant emission of an aircraft engine.

A preferred embodiment of the fuel cell system according to the invention preferably further comprises an apparatus for removing the cooling medium to the environment. Preferably, such an apparatus for removing the cooling medium to the environment is adapted to remove to the environment the cooling medium in the gaseous state of matter, if the heat stored in the cooling medium cannot be removed to the environment, or otherwise utilized, to a sufficient extent. The apparatus for removing the cooling medium to the environment can be realized, for example, in the form of an outlet valve, and ensures reliable operation of the fuel cell system according to the invention even if the removal of the heat stored in the cooling medium is rendered more difficult, for example as a result of high ambient temperature or conditions of calm.

In a method, according to the invention, for operating a fuel cell system comprising a fuel cell and an evaporative cooling system, which is in thermal contact with the fuel cell, in order that heat generated by the fuel cell during operation of the fuel cell is absorbed through evaporation of a cooling medium and is removed from the fuel cell, the pressure in the evaporative cooling system is sensed by means of an appropriate pressure sensing device. The operating temperature of the fuel cell is controlled by means of a control unit, in dependence on signals that are supplied to the control unit from the pressure sensing device. Control of the operating temperature of the fuel cell is effected in such a manner that the cooling medium of the evaporative cooling system is transferred from the liquid to the gaseous state of matter by the heat generated by the fuel cell during operation of the fuel cell.

Preferably, the operating temperature of the fuel cell is controlled, in dependence on the signals supplied to the control unit from the pressure sensing device, in such a way that the evaporation of the cooling medium of the evaporative cooling system by the heat generated by the fuel cell during operation of the fuel cell is effected in the wet-steam region of the cooling medium.

In a preferred embodiment of the method, according to the invention, for operating a fuel cell system, a desired pressure is generated in the fuel cell by means of a fuel-cell operating-pressure generating system. For example, a desired pressure is generated, by means of the fuel-cell operating-pressure generating system, in the anode region, in the cathode region, in the region of a membrane separating the anode region from the cathode region, in the anode gas lines and the cathode gas lines of the fuel cell.

The fuel-cell operating-pressure generating system, by means of a control unit for controlling the fuel-cell operating-pressure generating system, can be controlled such that there is generated in the fuel cell a pressure at which unwanted evaporation of substances and/or substances mixtures usually present in liquid form in the fuel cell is prevented.

Preferably, the control unit for controlling the fuel-cell operating-pressure generating system controls the pressure in the fuel cell in dependence on the operating temperature of the fuel cell and/or in dependence on the signals of the pressure sensing device for sensing the pressure in the evaporative cooling system.

The cooling medium evaporated during operation of the fuel cell for the purpose of cooling the fuel cell can be condensed in a condenser. Preferably, the cooling medium is condensed by a condenser realized in the form of an outer-skin cooler.

Alternatively or in addition thereto, heat stored in the cooling medium can also be supplied to at least one device for the utilization of this heat. For example, the heat stored in the cooling medium can be supplied to a device for utilizing this heat that is realized in the form of a steam heating means, a water desalination installation or a de-icing installation of an aircraft.

Further, water used as a cooling medium in the evaporative cooling system can also be supplied, in the form of liquid or vapour, into an exhaust-gas stream of an aircraft.

Preferably, the cooling medium is removed to the environment if required, i.e. when proper removal or utilization of the heat stored in the cooling medium is not possible.

The fuel cell system according to the invention is particularly suitable for use as a fuel-cell based energy supply unit in an aircraft, particularly a plane. For example, the fuel cell system can be used as an alternative to the auxiliary power unit (APU) or the ram air turbine (RAT), or as an energy supply system for a wing anti-ice system (WAIS). In order to cover the electrical power requirement in an aircraft, there may be a requirement for a fuel cell system capable of generating 1 MW of electrical power. The evaporative cooling system of the fuel cell system according to the invention is capable, despite its low weight and its compact design, of providing sufficient cooling capacity for cooling a high-power fuel cell. Moreover, autonomous operation of the cooling system is possible, independently of other aircraft systems, such as, for example, an aircraft air-conditioning installation. The fuel cell system according to the invention can therefore be used on board an aircraft, for example as an autonomous emergency electrical power supply unit.

In an aircraft equipped with the fuel cell system according to the invention, the fuel cell system, or at least the parts of the evaporative cooling system in which the cooling medium is evaporated, is/are preferably arranged in a non-pressurized region of the aircraft. Such regions in the aircraft are located, for example, in the main structure/fuselage covering (belly fairing) and in the fuselage aft section.

Figure 2:
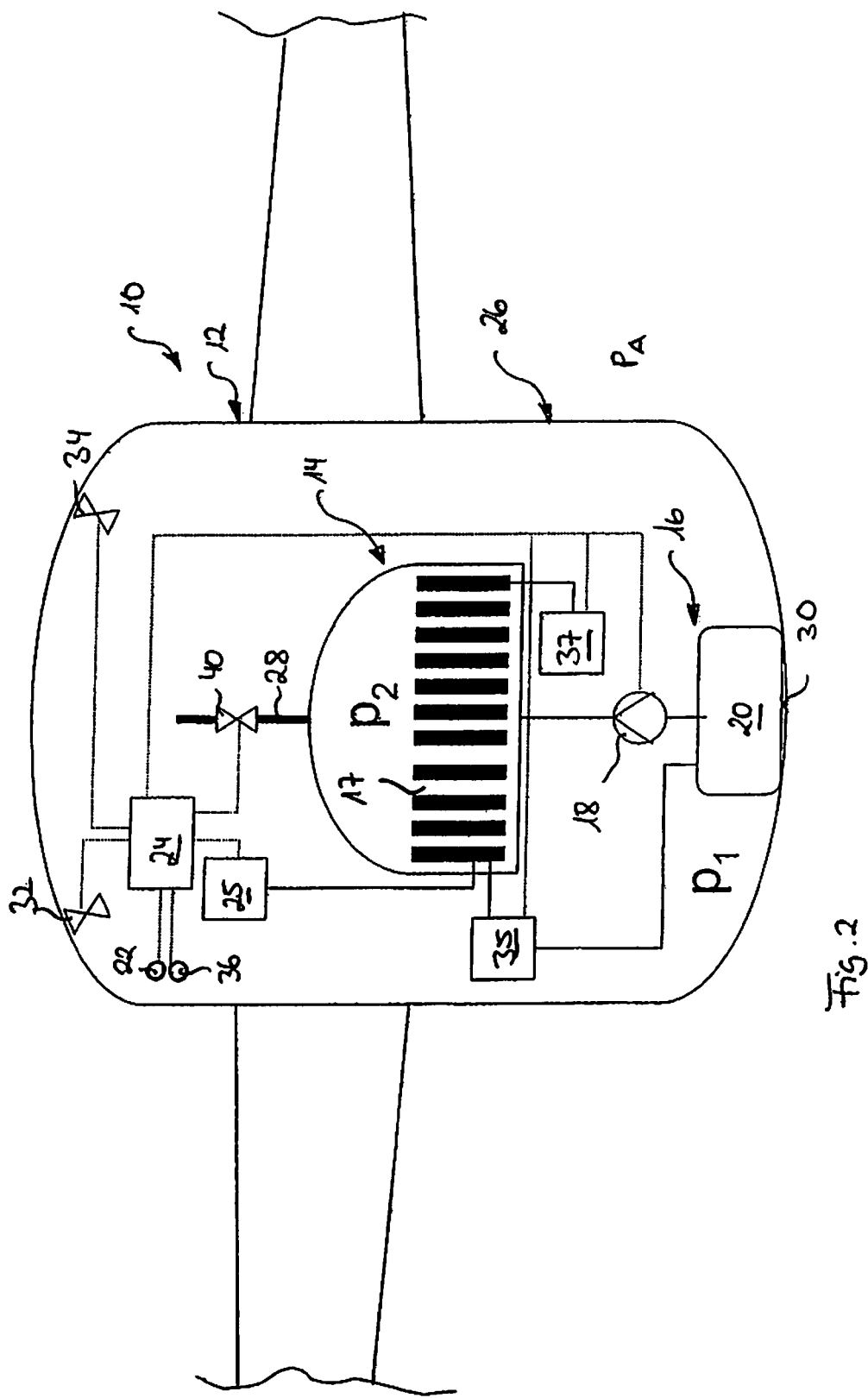
Figure 3:
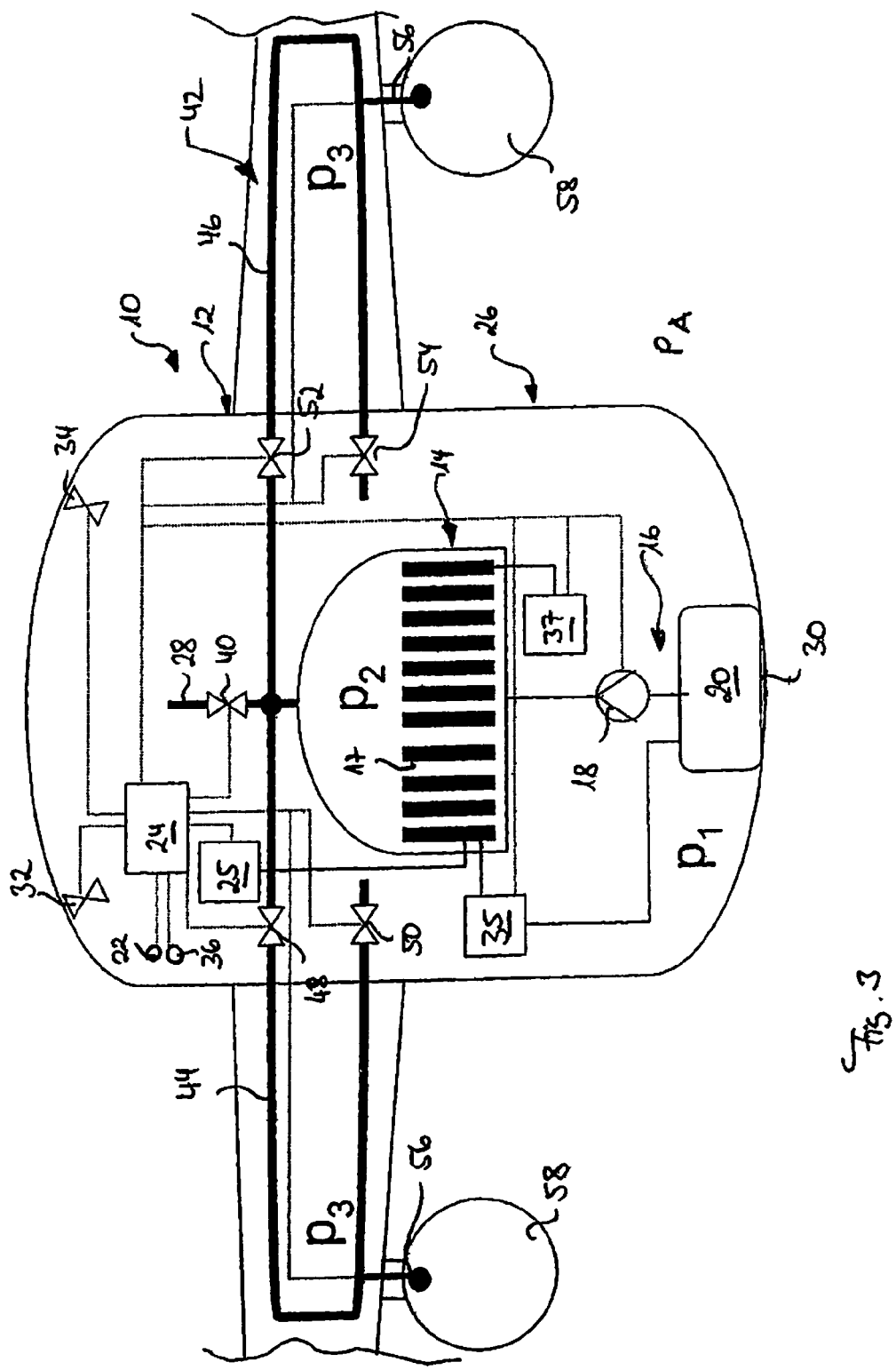

Three preferred exemplary embodiments of a fuel cell system according to the invention are now explained more fully with reference to the appended schematic figures, of which FIG. 1 shows a schematic representation of a first embodiment of a fuel cell system, FIG. 2 shows a schematic representation of a second embodiment of a fuel cell system, and FIG. 3 shows a schematic representation of a third embodiment of a fuel cell system.

FIG. 1 shows a fuel cell system 10, which is arranged in the belly fairing 12, i.e. in a non-pressurized region of an aircraft. The fuel cell system 10 comprises a fuel cell 14 realized in the form of a fuel-cell stack. The fuel cell 14 is realized as a low-temperature PEM fuel cell having an operating temperature range of between 60 and 110° C. The optimum operating temperature range of the fuel cell 14 is between 60 and 90° C.

An evaporative cooling system 16 provided for cooling the fuel cell 14 comprises cooling channels 17, which are realized in bipolar plates of the fuel cell 14 that are not represented in greater detail in FIG. 1. Water, serving as a cooling medium, flows through the cooling channels 17 during operation of the fuel cell 14. The water, in a liquid state of matter, is supplied to the cooling channels 17 from a cooling-medium tank 20, by means of a pump 18.

Further arranged in the interior of the belly fairing 12 is a pressure sensor 22. The pressure sensor 22 measures the pressure in the interior of the belly fairing 12, which pressure corresponds to the pressure in the evaporative cooling system 16, i.e. the pressure in the cooling channels 17. As already mentioned, the belly fairing 12 belongs to the non-pressurized regions of the aircraft, such that the pressure $p_1$ present in the interior of the belly fairing 12 and measured by the pressure sensor 22 corresponds substantially to the ambient pressure $p_A$ in the environment of the aircraft. When the aircraft is in flight, and particularly when the aircraft is at its cruising altitude, this pressure is significantly less than the atmospheric pressure at sea-level.

Signals emitted by the pressure sensor 22, which are characteristic of the ambient pressure in the interior of the belly fairing 12, are supplied to an electronic control unit 24. On the basis of the signals of the pressure sensor 22, the electronic control unit 24 controls the operating temperature of the fuel cell 14 in such a manner that the water is transferred from the liquid to the gaseous state of matter as it flows through the cooling channels 17 realized in the bipolar plates of the fuel cell 14. The evaporation of the water flowing through the cooling channels 17 causes the heat of reaction generated by the fuel cell 14 during operation to be absorbed by the water serving as a cooling medium.

In particular, the electronic control unit 24 controls the operating temperature of the fuel cell 14, in dependence on the signals supplied to the control unit 24 from the pressure sensor 22, in such a manner that the evaporation of the water flowing through the cooling channels 17 of the evaporative cooling system 16 by the heat of reaction generated by the fuel cell 14 during operation is effected in the wet-steam region. In order to achieve this, the control unit 24 always controls the operating temperature of the fuel cell 14 such that the operating temperature of the fuel cell 14 is about 0 to 5° C. above the pressure-dependent evaporation temperature of the cooling medium water.

The operating temperature of the fuel cell 14 is thus controlled by the control unit 24, in dependence on the flight altitude of the aircraft and the resultant pressure in the belly fairing 12, such that it always follows the pressure-dependent evaporation curve of the cooling medium water. Table 1 gives corresponding values for the boiling or evaporation temperature, and the boiling or evaporation pressure, of the cooling medium water, in dependence on the flight altitude of the aircraft.

TABLE 1

Boiling temperature and boiling pressure of the cooling medium water in dependence on the flight altitude of the aircraft (northern hemisphere, 45°N, July)

| Boiling temperature, [° C.] | Boiling pressure, [bar] | Flight altitude, [m] |
|---|---|---|
| 59 | 0.1901 | 12497 (41000 feet) |
| 60 | 0.1992 | 12192 (40000 feet) |
| 70 | 0.3116 | 9144 (30000 feet) |
| 80 | 0.4736 | 6096 (20000 feet) |
| 90 | 0.7011 | 3048 (10000 feet) |
| 100 | 1.0132 | 0 |
| 120.23 | 2 | — |

It is evident from Table 1 that the fuel cell 14 can be operated at an operating temperature of approximately 60° C. when the aircraft is at cruising altitude. When the aircraft is in ascent and descent, the operating temperature of the fuel cell 14 is adapted continuously to the varying ambient pressure by the control unit 24. In other words, the operating temperature of the fuel cell 14 is made to track the pressure-dependent evaporation curve of the cooling medium water in such a way that the evaporation of the cooling medium water in the cooling channels 17 of the evaporative cooling system 16, both during ascent and descent of the aircraft, is effected in the wet-steam region. As a result, proper evaporation of the cooling medium flowing through the cooling channels 17 of the evaporative cooling system 16 is always ensured. At the same time, operation of the fuel cell 14 at unnecessarily high operating temperatures is avoided.

Table 1 shows that the fuel cell 14 can be operated in the optimum operating temperature range of from 60 to 90° C. over a large portion of its operating time. Higher operating temperatures of the fuel cell 14 are only necessary when the aircraft is flying at an altitude of under 3048 m (10000 feet) or is on the ground.

In order to prevent unwanted evaporation of water usually present in liquid form in the fuel cell 14, i.e., for example, in an anode region, a cathode region, in the region of a membrane separating the anode region from the cathode region, in anode gas lines or cathode gas lines, the control unit 24 controls a fuel-cell operating-pressure generating system 25, which is integrated into a media supply system of the fuel cell 14, in such a manner that there is generated in the fuel cell 14 an operating pressure at which unwanted evaporation of the liquid water present in the fuel cell is prevented. The low-temperature PEM fuel cell 14 shown in FIG. 1 is operated at an operating pressure of 2 bar. At a pressure of 2 bar, the evaporation temperature of water is 120.23° C., such that evaporation of the liquid water present in the fuel cell 14 is reliably prevented in the entire operating temperature range of the fuel cell 14.

The fuel cell system 10 shown in FIG. 1 further comprises a condenser 26 realized in the form of an outer-skin cooler. The condenser 26 serves to bring back to the liquid state of matter the water evaporated during operation of the fuel cell 14 for the purpose of cooling the fuel cell 14. The condenser 26 is constituted, in the region of the belly fairing 12, by the aircraft outer skin, which is composed of a titanium alloy, an aluminium alloy, a fibre-plastic compound material or glass-fibre reinforced aluminium. The water that is evaporated as it flows through the cooling channels 17 of the evaporative cooling system 16 emerges from the cooling channels through a steam outlet line 28, becomes distributed in the interior of the belly fairing 12 and travels to an inner face of the aircraft's outer skin, without the necessity to provide pipelines. The water vapour condenses on the inner face of the aircraft's outer skin, and emits the thereby released condensation heat to the environment, via the outer face of the aircraft's outer skin.

If the fuel cell 14 generates, for example, 1 MW of electrical power, it is necessary for 0.5 liters of water per second to be evaporated during operation of the fuel cell 14 in order to provide for proper removal of the heat of reaction from the fuel cell 14. The water vapour travels, via the steam outlet line 28, through the interior of the belly fairing 12 to the inner face of the aircraft's outer skin, where it condenses. Thus, during operation of the fuel cell 14, approximately 0.5 liters per second of condensed water run down on the inner face of the aircraft's outer skin.

The condensed water running down on the inner faces of the aircraft's outer skin is collected in a condensate collecting region 30. The condensate collecting region 30 is located in a region of the aircraft's outer-skin portion that constitutes the condenser 26, which is located close to the floor, such that gravity can be utilized to collect the condensed water. From the condensate collecting region 30, the condensed water is conveyed, by means of the pump 18, either into the cooling-medium tank 20 or returned directly into the cooling channels 17 realized in the bipolar plates of the fuel cell 14. A closed cooling-medium circuit is thereby produced.

Clearly, the components arranged in the interior of the belly fairing 12 must be protected against moisture. However, since water vapour of a temperature of at least approximately 60° C. is being supplied continuously to the interior of the belly fairing 12, via the steam outlet line 28, during operation of the fuel cell 14, there is no need for the components arranged in the interior of the belly fairing 12 to be protected against ice and cold during flight. The belly fairing 12 can be realized as a compartment accommodating the fuel cell system 10. The water vapour produced by the evaporative cooling system 16 can be used for ventilation and/or inerting of this compartment.

In order to ensure reliable operation of the fuel cell system 10 even if proper removal, via the condenser 26, of the fuel-cell heat of reaction stored in the cooling medium water is rendered more difficult because of high ambient temperatures or in the case of conditions of calm, the fuel cell system 10 further comprises an apparatus, realized in the form of two steam outlet valves 32, 34, for removing the cooling medium water to the environment. The steam outlet valves 32, 34 are actuated by means of the electronic control unit 24. For this purpose, the control unit 24 receives signals from the pressure sensor 22 and/or from a temperature sensor 36 for measuring the temperature in the interior of the belly fairing 12. If the pressure sensor 22 and/or the temperature sensor 36 indicates/indicate that the pressure and/or the temperature in the belly fairing 12 exceeds/exceed a predefined critical maximum value/values, the steam outlet values 32, 34 are opened by the electronic control unit 24, such that water vapour delivered into the interior of the belly fairing 12 via the steam outlet line 28, and thus also the thermal energy stored in the water vapour, can be removed from the interior of the belly fairing 12 into the environment.

In order to ensure proper functioning of the evaporative cooling system 16 even in the event of failure of the condenser 26 or following removal of cooling medium to the environment, provision must be made for a supply of cooling medium into the evaporative cooling system 16, i.e. into the coolant tank 20 or the cooling channels 17, that is independent of the condensing of the cooling medium evaporated as it flows through the cooling channels 17. For this purpose, the fuel cell system 10 has a process-water take-off apparatus 35, which serves to receive water produced by the fuel cell 14 during operation and supply it to the coolant tank 20 of the evaporative cooling system 16.

Finally, the fuel cell system 10 has a storage system 37 for storing electrical energy generated during operation of the fuel cell 14. The storage system 37 serves to intermediately store excess energy generated by the fuel cell 14 and, if required, deliver it to loads on board the aircraft that are supplied with electrical energy by the fuel cell system 10. The storage system 37 can comprise, for example, a super-capacitor or a plurality of super-capacitors.

In principle, the belly fairing 12 can also be realized as a pressure vessel. In this case, the pressure $p_1$ in the interior of the belly fairing 12 can also be above the ambient pressure $p_A$.

Since the cooling-medium vapour is compressible, the interior of the belly fairing 12 can then also serve as a storage vessel for absorbing load fluctuations. Moreover, in the case of specific variation of the pressure $p_1$ in the interior of the belly fairing 12 through corresponding control of the pump 18, and of the heat input through the fuel cell 14, and of the steam outlet valves 32, 34, it is possible to influence the intensity of the heat transfer on an inner face of the belly-fairing wall, since the heat transfer is pressure-dependent. However, design of the belly fairing 12 as a pressure vessel necessitates a corresponding reinforcement of the belly-fairing wall, and therefore results in an unwanted increase in weight.

The fuel cell system 10 shown in FIG. 2 differs from the fuel cell system according to FIG. 1 in that the fuel cell 14 is realized, not as a low-temperature PEM fuel cell, but as a high-temperature PEM fuel cell. The high-temperature PEM fuel cell 14 according to FIG. 2 is normally operated at higher operating temperatures (up to 200° C.) than the low-temperature PEM fuel cell 14 shown in FIG. 1.

Moreover, a valve 40, which, in its closed position, delimits a pressure zone comprising the cooling channels 17 of the evaporative cooling system 16, is arranged in the steam outlet line 28 that is connected to the cooling channels 17 of the evaporative cooling system 16. This pressure zone can be so designed that it can withstand an overpressure of several bars. By means of the pump 18, therefore, a pressure $p_2$ that is higher than the pressure $p_1$ in the belly fairing 12 can be produced in the pressure zone comprising the cooling channels 17 of the evaporative cooling system 16. A pressure sensor, not shown in FIG. 2, can be provided to measure the pressure in this pressure zone.

In the fuel cell system shown in FIG. 2, at a pressure in the cooling channels 17 of the evaporative cooling system 16 that corresponds to a low ambient pressure $p_A$, there can occur superheating and consequently overheating of material and damage to material in the cooling channels 17 of the evaporative cooling system 16, owing to the large difference between the relatively low evaporation temperature of the cooling medium at low pressure and the relatively high operating temperature of the high-temperature PEM fuel cell 14. In order to prevent this, the pressure in the cooling channels 17 of the evaporative cooling system 16 is specifically increased, by means of the pump 18, in order so to raise the evaporation temperature of the cooling medium that an optimum boiling behaviour of the cooling medium is effected at the operating temperature of the high-temperature PEM fuel cell 14.

The control unit 24 can control the operating temperature of the fuel cell 14, in dependence on the pressure in the cooling channels 17 of the evaporative cooling system 16, such that the evaporation of the water flowing by the cooling channels, by the heat of reaction generated by the fuel cell 14 during operation, is effected in the wet-steam region. As an alternative thereto, however, the control unit 24 can also use the operating temperature of the fuel cell 14 as a control variable, and control the pressure in the cooling channels 17 of the evaporative cooling system 16, in dependence on the operating temperature of the fuel cell 14, such that the evaporation of the water flowing through the cooling channels, by the heat of reaction generated by the fuel cell 14 during operation, is effected in the wet-steam region. The operation of the fuel cell system 10 shown in FIG. 2 can thus be effected irrespective of the ambient pressure $p_A$ and therefore irrespective of the flight altitude of the aircraft. Moreover, a variation of the pressure in the cooling channels 17 of the evaporative cooling system 16 renders possible control of the heat transfer in the cooling channels 17. The interaction between the pump 18, the heat of reaction generated by the fuel cell 14 during operation, the valve 40 and the steam outlet valves 32, 34 is controlled by the control unit 24 in dependence on meteorologically determined and operational influencing variables, such as flight altitude, load demand of an on-board electrical power system, the load state of the storage system 37, etc. In other respects, the structure and the functioning of the fuel cell system 10 represented in FIG. 2 correspond to the structure and the functioning of the arrangement according to FIG. 1.

The fuel cell system 10 illustrated in FIG. 3 differs from the arrangement shown in FIG. 2 in that the fuel cell system 10 comprises, not only a condenser 26 for removing the fuel-cell heat of reaction to the environment, but also a device 42, realized in the form of a de-icing installation, for utilizing the heat stored in the cooling medium water. The de-icing installation comprises two steam lines 44, 46, which branch off from the steam outlet line 28, and through which water vapour emerging from the cooling channels 17 of the evaporative cooling system 16 can be taken away and delivered into regions of the aircraft that are to be de-iced.

The water vapour, as it flows through the steam lines 44, 46, releases to the regions of the aircraft to be de-iced the thermal energy stored in the vapour, and is then returned, either still in gaseous form or in liquid form, into the interior of the belly fairing 12. Pressure control valves 48, 50, 52, 54 are arranged in the steam lines 44, 46 for the purpose of controlling a desired pressure in the steam lines 44, 46. The pressure control valves 48, 50, 52, 54 are controlled in dependence on the desired pressure $p_2$ in the cooling channels 17 of the evaporative cooling system 16 and a desired pressure $p_3$ in the steam lines 44, 46. However, the pressure $p_3$ in the steam lines 44, 46 cannot exceed the pressure $p_2$ in the cooling channels 17 of the evaporative cooling system 16. A variation of the pressure in the steam lines 44, 46 enables the heat transfer in the steam lines 44, 46 to be controlled. The interaction between the pump 18, the heat of reaction generated by the fuel cell 14 during operation, the valve 40, the pressure control valves 48, 50, 52, 54 and the steam outlet valves 32, 34 is controlled by the control unit 24 in dependence on meteorologically determined and operational influencing variables, such as flight altitude, load demand of an on-board electrical power system, the load state of the storage system 37, etc. and, if necessary, with specification of a priority de-icing of the main structure.

Moreover, the fuel cell system 10 illustrated in FIG. 3 comprises two supply installations 56 for supplying water vapour into an exhaust-gas stream of two aircraft engines 58. The water vapour can be sucked into the exhaust-gas stream of the aircraft engines 58 through, for example, venturi tubes. The supplying of water vapour into the exhaust-gas stream of the aircraft engines 58 can reduce the pollutant emission of the engines 58. In other respects, the structure and the functioning of the fuel cell system 10 represented in FIG. 3 correspond to the structure and the functioning of the arrangement according to FIG. 2.

The invention claimed is:
1. An aircraft fuel cell system having one or more components at least partially arranged in a non-pressurized portion of an aircraft in which it is installed, the system comprising:
a fuel cell;
an evaporative cooling system in thermal contact with the fuel cell and adapted to absorb and remove heat generated by the fuel cell during operation of the fuel cell through evaporation of a cooling medium to cool the fuel cell;

a device adapted to sense a pressure in the evaporative cooling system; and a control unit adapted to adjust an operating temperature of the fuel cell in dependence on signals that are supplied to the control unit from the device for sensing the pressure in the evaporative cooling system to track a pressure-dependent evaporation curve of the cooling medium such that evaporation of the cooling medium during ascent and descent of the aircraft, is effected in a wet-steam region of the cooling medium.

2. The aircraft fuel cell system according to claim 1, further comprising a fuel-cell operating-pressure generating system generating a desired pressure in the fuel cell, wherein the fuel-cell operating-pressure generating system is controlled by the control unit.

3. The aircraft fuel cell system according to claim 2, wherein the desired pressure generated in the fuel cell prevents unwanted evaporation of substances and/or substance mixtures present in liquid form in the fuel cell.

4. The aircraft fuel cell system according to claim 2, wherein the control unit is adapted to control the pressure in the fuel cell based on one of the operating temperature of the fuel cell or the signals of the device for sensing the pressure in the evaporative cooling system.

5. The aircraft fuel cell system according to claim 1, wherein the evaporative cooling system comprises a condenser for condensing the cooling medium evaporated during operation of the fuel cell for the purpose of cooling the fuel cell.

6. The aircraft fuel cell system according to claim 5, wherein the condenser is an outerskin cooler.

7. The aircraft fuel cell system according to claim 1, further comprising at least one device for utilizing heat stored in the cooling medium.

8. The aircraft fuel cell system according to claim 7, wherein the at least one device for utilizing the heat stored in the cooling medium is one of a steam heating means, a water desalination installation or a deicing installation.

9. The aircraft fuel cell system according to claim 1, further comprising an apparatus for removing the cooling medium to an ambient environment.

10. An aircraft fuel cell system having one or more components at least partially arranged in a non-pressurized portion of an aircraft in which it is installed, the system comprising:

a fuel cell;

an evaporative cooling system in thermal contact with the fuel cell and adapted to absorb and remove heat generated by the fuel cell during operation of the fuel cell through evaporation of a cooling medium to cool the fuel cell;

a device for sensing a pressure in the evaporative cooling system; and a control unit adapted to adjust an operating temperature of the fuel cell in dependence on signals that are supplied to the control unit from the device for sensing the pressure in the evaporative cooling system to track a pressure-dependent evaporation curve of the cooling medium such that evaporation of the cooling medium during ascent and descent of the aircraft is effected in a wet-steam region of the cooling medium, wherein the control unit is configured to control the evaporation of the cooling medium in the wet-steam region of the cooling medium during ascent and descent of the aircraft by adjusting an operating temperature of a low-temperature polymer electrolyte membrane (PEM) in dependence on the ambient pressure.

11. An aircraft fuel cell system having one or more components at least partially arranged in a non-pressurized portion of an aircraft in which it is installed, the system comprising:

a fuel cell;

an evaporative cooling system in thermal contact with the fuel cell and adapted to absorb and remove heat generated by the fuel cell during operation of the fuel cell through evaporation of a cooling medium to cool the fuel cell;

a device adapted to sense a pressure in the evaporative cooling system; and a control unit adapted to adjust an operating temperature of the fuel cell in dependence on signals that are supplied to the control unit from the device for sensing the pressure in the evaporative cooling system to track a pressure-dependent evaporation curve of the cooling medium such that evaporation of the cooling medium during ascent and descent of the aircraft is effected in a wet-steam region of the cooling medium, wherein the control unit is configured to control the evaporation of the cooling medium in the wet-steam region of the cooling medium during ascent and descent of the aircraft by adjusting an operating temperature of a high-temperature polymer electrolyte membrane (PEM) in dependence on a pressure generated by a pump or by adjusting the pressure generated by the pump in dependence on the operating temperature of the high temperature PEM.

* * * * *